Figure 1:
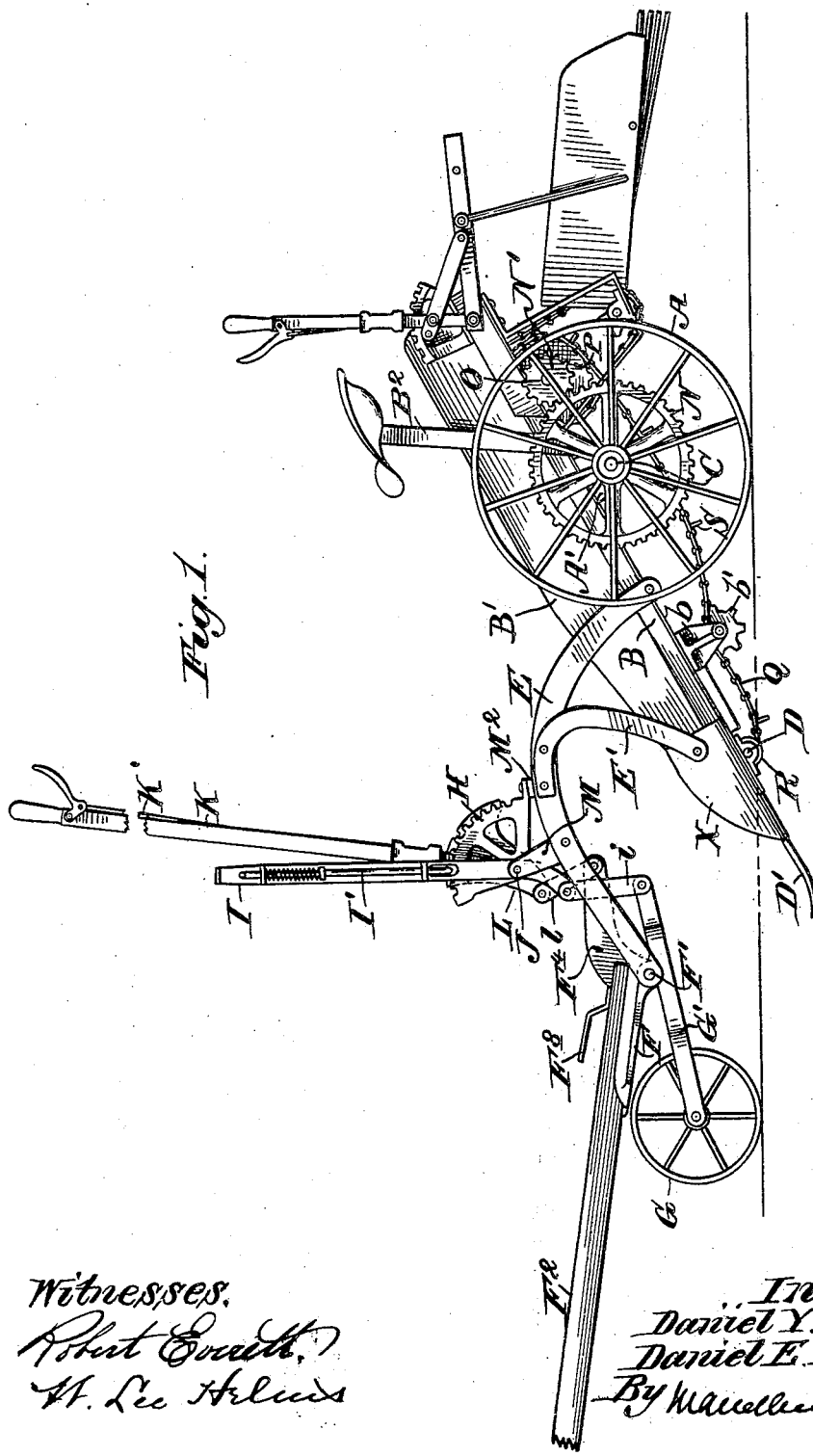

No. 886,322. PATENTED APR. 28, 1908.
D. Y. & D. E. HALLOCK.
POTATO DIGGER.
APPLICATION FILED JAN. 16, 1908.

3 SHEETS—SHEET 1.

Witnesses.
Robert Everett
H. Lee Helmes

Inventors
Daniel Y. Hallock,
Daniel E. Hallock.
By Marcellus Bailey
Atty.

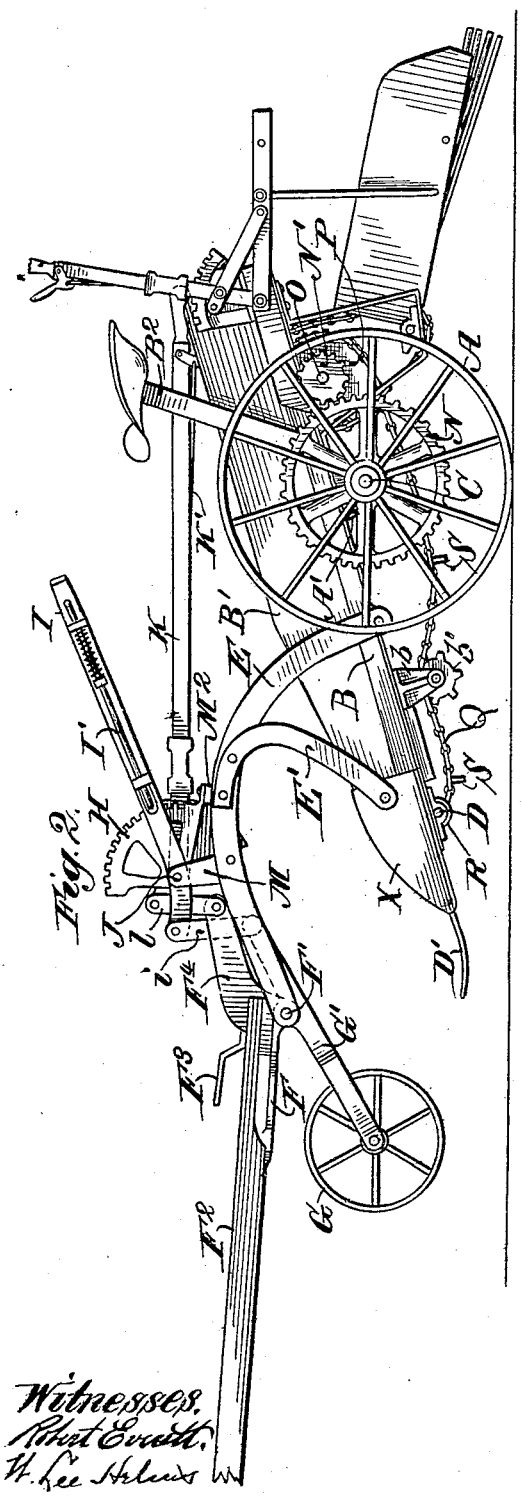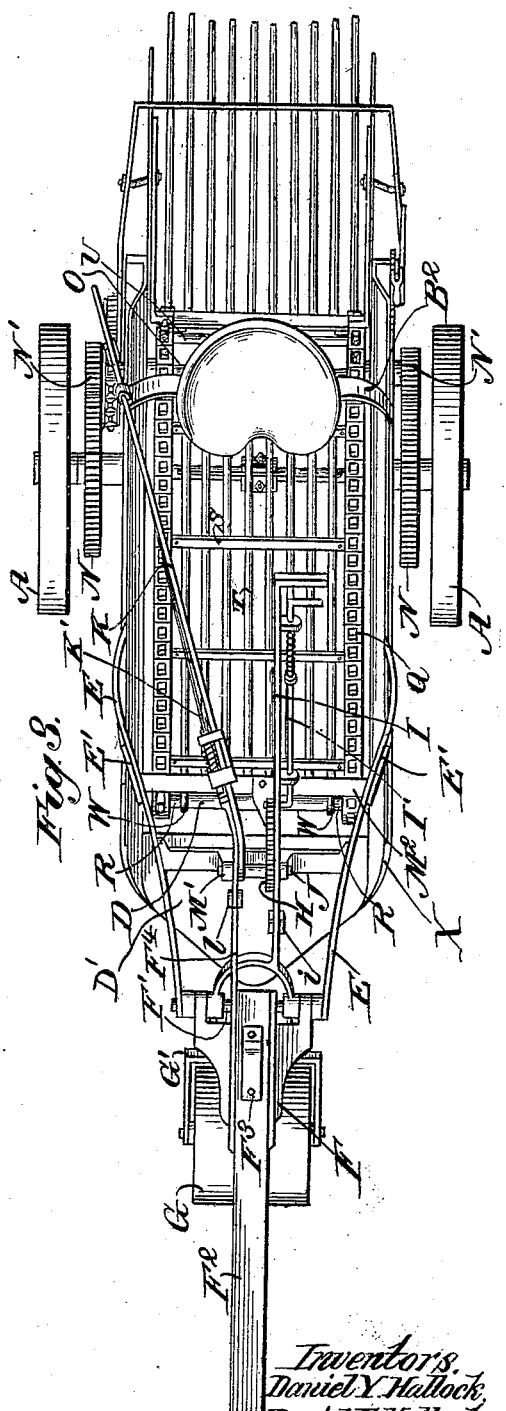

No. 886,322. PATENTED APR. 28, 1908.
D. Y. & D. E. HALLOCK.
POTATO DIGGER.
APPLICATION FILED JAN. 16, 1908.
3 SHEETS—SHEET 3.
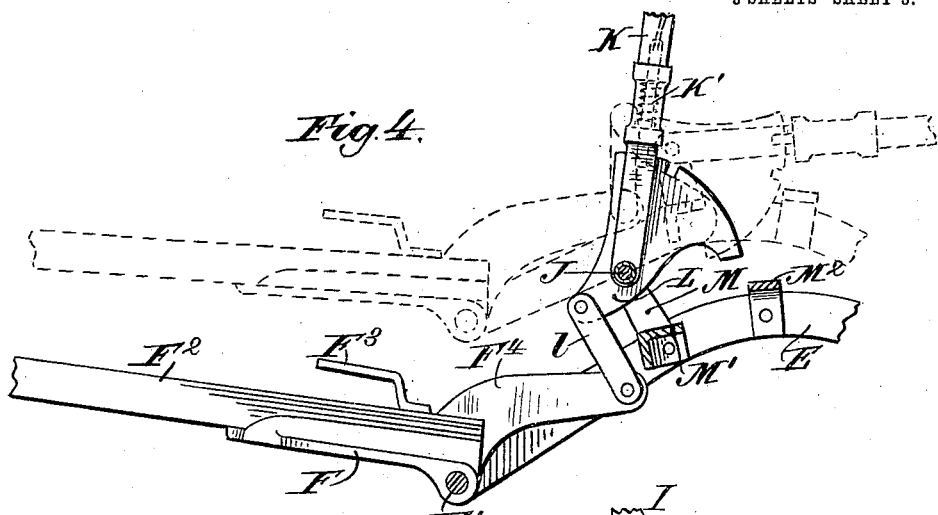
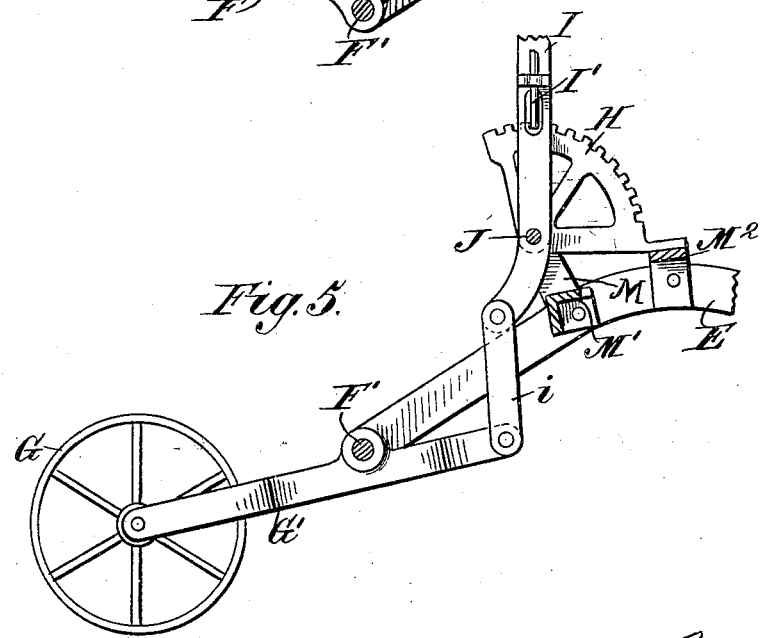
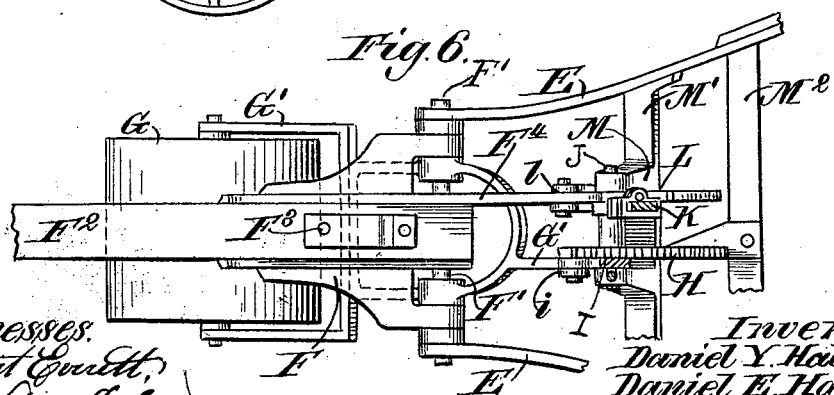
Witnesses.
Inventors.
Daniel Y. Hallock.
Daniel E. Hallock.

UNITED STATES PATENT OFFICE.

DANIEL Y. HALLOCK AND DANIEL E. HALLOCK, OF YORK, PENNSYLVANIA, ASSIGNORS TO A. B. FARQUHAR COMPANY, LIMITED, OF YORK, PENNSYLVANIA, A LIMITED CORPORATION.

POTATO-DIGGER.

No. 886,322.         Specification of Letters Patent.      Patented April 28, 1908.

Original application filed March 2, 1907, Serial No. 360,194. Divided and this application filed January 16, 1908. Serial No. 411,170.

*To all whom it may concern:*

Be it known that we, DANIEL Y. HALLOCK and DANIEL E. HALLOCK, of York, in the county of York and State of Pennsylvania, have invented certain new and useful Improvements in Potato-Diggers, of which the following is a specification.

This application is a division of our prior application Serial No. 360,194, filed February 2, 1907, and is directed to that portion of the potato digger shown and described in said application which is not embraced in the claims thereof.

In the drawings accompanying and forming a part of the specification—Figure 1 is a side elevation of a potato digger embodying our improvements in their preferred form with the parts in the position they occupy when the shovel is in the ground. Fig. 2 is a like view of the same with the parts in the position they occupy with the shovel and truck or gage wheel raised above the ground. Fig. 3 is a plan of the machine. Fig. 4 is a sectional side elevation on enlarged scale of the mechanism for raising both shovel and gage wheel simultaneously. Fig. 5 is a like view of the mechanism for adjusting the truck or gage wheel with relation to the shovel. Fig. 6 is a plan of the assembled mechanisms of Figs. 4 and 5.

A A are the traction wheels and C is the axle on which they are mounted. The main frame consists essentially of the two side bars or rails B B (preferably of angle steel) bolted rigidly at or near their front ends to the cross connecting rod or shaft D, and connected at their rear ends by the cross shaft O, on which are mounted the elevator sprocket wheels P.

The main frame is supported and can tilt or turn on the main axle, C, for which purpose the side rails B of the frame are secured to standards A' journaled upon the axle. To the side rails are rigidly bolted front sections or castings X X to which is secured the scoop or shovel D'. Under the side rails B are secured hangers b in which are journaled sprocket wheels b' to support and take care of the sag of the endless links belts Q. The latter pass around the driven sprocket wheels P at rear, and the idle pulleys or rollers R, R at front—these rollers R, R being mounted to revolve upon the cross rod or shaft D. To the link belts are attached transverse angle bars S at suitable intervals apart, which move along over the bottom, or separator screen, hereinafter described, serving to lift and move towards the tail of the screen the material which passes over from the shovel. Side boards B' extend lengthwise of the side rails B to hold the soil and tubers within the control of the elevator. They are bolted to the sections X X and also to the seat support B², which latter is rigidly secured to the side rails B.

F² is the pole and F is the pole iron rigidly secured to the rear end of the pole and provided with eyes for reception of the cross bolt F' which constitutes at once the draft bolt and the pivotal or hinge connection between the main frame and the pole. From each side rail B of the main frame there is a forward extension in the shape of an arm E, these arms curving inwardly towards each other and having their front ends rigidly connected by suitable means to draft bolt F'. Braces E' bolted to the side bars B and the forward extensions E serve to stiffen the latter.

G is the adjustable truck for controlling the penetration or working depth of the shovel. It is journaled in a truck frame G' pivoted or hung upon the draft bolt F' as an axis, and having its upper end connected by a pivoted link $i$ to an adjusting lever I. Lever I is journaled upon a cross stud J extending between and supported at its ends in two uprights M M erected upon a cross shaft M' extending between and rigidly secured to the arms E. With the adjusting lever I is associated a stationary notched quadrant H, mounted at its front end on the cross stud J and at its other end bolted to a second cross brace M², extending between and rigidly secured to the frame arms E. The "depth-gage" lever I, as it may be termed, is provided with the usual spring latch I' for engaging the selected notch in the quadrant. The working depth of the shovel is regulated by the distance the truck stands above the level of the point of the shovel, and this distance, it will be noted, can be readily varied by the vertical adjustment of the front end of the truck frame through the instrumentality of lever I, the truck frame swinging for this purpose upon the draft bolt F' as an axis.

In order to lift the truck and shovel bodily and together above and out of contact with the ground, for convenience in turning, backing or driving on the road, we employ the following devices: On the pole iron F is an arm F⁴ which extends rearwardly beyond the draft bolt F' and, by a pivoted link l, is connected to the lower end of a lever L having a head in the shape of a notched quadrant, this lever being hung on the cross stud J as an axis. Associated with the lever L is an operating lever handle K also pivoted on the cross stud J and having a spring pressed latch K', of the usual type, to engage the selected notch in the lever quadrant. The two parts when thus adjusted move as one and are in fact one—the only purpose in making the handle K separate from the quadrant lever being to provide a means by which the normal position of the lever handle when in forward position—when the main frame is "floating" as it is termed—may be adjusted so as to be within easy and convenient reach of the driver. By bringing the handle lever down from the position shown in Fig. 1 to that shown in Figs. 2 and 3, the truck and the main frame will be lifted above the ground simultaneously and together, the pole iron pivoting for this purpose on the draft bolt F'—the weight of the parts thus lifted above the ground level being sustained between the main axle of the machine at rear, and the team yoke in front. This of course takes place without disturbing the relations of the truck and shovel, the adjustment of which with respect to one another remains unchanged, so that after the "depth-gage" lever I has been once set, no further manipulation of it is required, no matter how often the truck and the shovel may be lifted above the ground level. Under this arrangement the fewest possible parts are employed to secure the two adjustments, and the arrangement itself is simple, strong and convenient. The joint between the pole and the machine frame permits of only vertical movement on the axis of the draft bolt; it is rigid laterally. The hitching point of the team to the pole (indicated at F³) may be close to the shovel, while the draft connection of the pole with the machine is well forward, which is favorable for light draft, and reduces the strain on the machine when striking rocks.

On the main axle C are master gear wheels N N which are driven by the traction wheels A A through the intermediary of the usual ratchet and pawl devices located in the meeting faces of the hubs of the gear wheels and traction wheels, adapted to drive the gear wheels only when the machine is moving forward—the pawls riding over the ratchets when the motion of machine is reversed. Devices of this kind and for use in this class of machines, are well known and require no illustration inasmuch as they form no part of our invention. The master gear wheels engage and drive pinions N' N' fast on the shaft O on which the elevator sprocket wheels are secured.

The bottom of the elevator, which forms a separator screen, consists of a series of evenly spaced fingers or rods T, which extend lengthwise of the machine and parallel with one another, in an upwardly inclined position from front to rear. These rods which are arranged between the elevator link belts Q are preferably round in cross section, and are arranged in the same plane. Like the tines of a barn yard fork they have no connection with one another or with anything else except at the front where they are mounted in a cross head, which is journaled in the frame of the machine by means of eyes W (Fig. 3) on the front ends of the outer rods T which are mounted and can turn on the cross shaft D. The screen is agitated by locating the rear ends of the rods T over, and in the path of movement of, the horizontal bars U (Fig. 3) of a reel formed by extending these bars between, and securing them to, the elevator sprocket wheels P.

At the rear of the elevator screen, is the rear supplemental screen and its operating mechanism—description of which is here omitted inasmuch as the same forms the subject matter of our aforesaid application Serial No. 360,194.

What we here claim and desire to secure by Letters Patent is—

1. In a potato digger, the combination of the shovel, the main frame and the axle and wheels by which the same are carried, the pole, the transverse draft bolt by which the rear end of the pole is jointed to the frame, the truck, the truck supporting frame mounted and capable of swinging movement on the draft bolt, the "depth-gage" lever on the main frame and connections between said lever and the truck frame whereby the latter may be swung upon the draft bolt in a direction to raise or lower the truck as desired, and locked in its adjusted position, substantially as and for the purposes hereinbefore set forth.

2. In a potato digger, the combination of the shovel, the main frame and the wheels and axle by which the same are carried, the pole, the transverse draft bolt by which the pole is jointed to the frame, the truck, the truck supporting frame mounted, and capable of swinging movement, upon the draft bolt, the depth gage lever on the main frame and connections between it and the truck frame for adjusting the latter, the lifting lever mounted also on the main frame, and connections between said lifting lever and
5 the pole whereby the truck and shovel may be lifted bodily and together above the ground and held in that position, substantially as hereinbefore set forth.

In testimony whereof we affix our signatures in presence of two witnesses.

DANIEL Y. HALLOCK.
DANIEL E. HALLOCK.

Witnesses:
H. P. GOODLING,
JACOB E. WEAVER.